H. W. RYDING.
DINNER PAIL.
APPLICATION FILED JUNE 18, 1906.

935,692.

Patented Oct. 5, 1909.

Witnesses:
Carl T. Johnson
Olof Horsse

Inventor:
Henry W. Ryding

UNITED STATES PATENT OFFICE.

HENRY W. RYDING, OF FALUN, KANSAS.

DINNER-PAIL.

935,692.  Specification of Letters Patent.  Patented Oct. 5, 1909.

Application filed June 18, 1906. Serial No. 322,322.

*To all whom it may concern:*

Be it known that I, HENRY W. RYDING, a citizen of the United States, residing at Falun, in the county of Saline and State of Kansas, have invented certain new and useful Improvements in Dinner-Pails, of which the following is a specification, reference being had therein to the accompanying drawings, forming part of this specification, in which—

Figure 1:
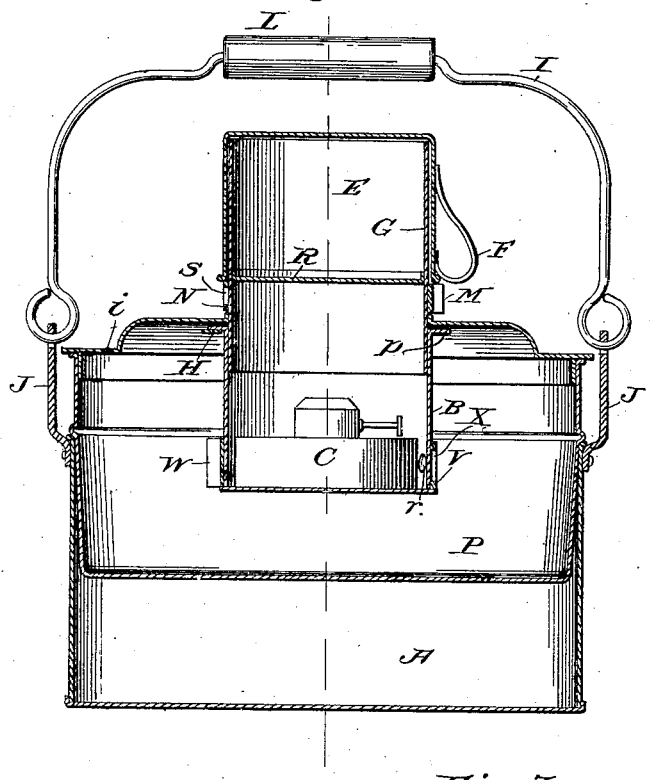
Figure 2:
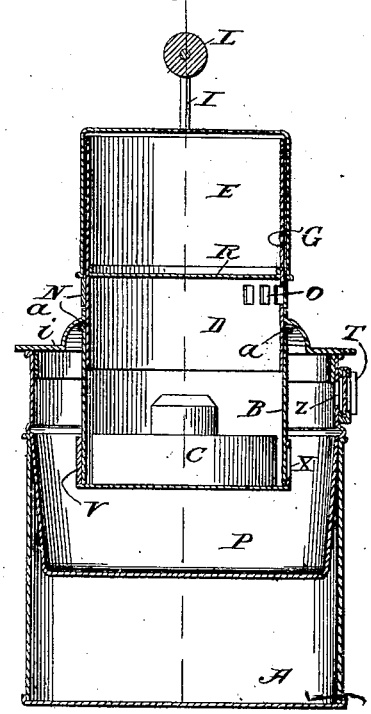
Figure 3:
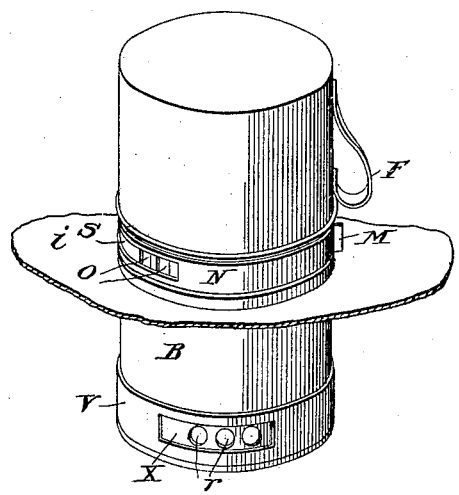

Figure 1 is a vertical longitudinal sectional view of my improved dinner pail, and on the broken line of Fig. 2. Fig. 2 is a vertical transverse sectional view at right angles to the view in Fig. 1 and on the broken line of that figure. Fig. 3 is a full view of the improvement as described in this specification.

Similar letters refer to similar parts.

My invention refers to improvements in dinner pails or vessels of like character adapted to contain food; and it has for its objects to provide for the heating of coffee or other liquid and to impart a comfortable and appetizing warmth to the balance of the food contained in the pail, by means of a specially-constructed arrangement adapted to accomplish the desired results.

Referring to the drawings, "A" is the pail, "J" are the ears to which the bail is attached, "I" is the bail, and "L" is the handle; "P" is a tray placed in the body of the pail, "A," in the usual way; "*i*" is a lid covering the tray, "P."

"G" is a tube or hollow cylinder with the lower end extending through and to a suitable distance below the lid, "*i*," and to which it is permanently secured. It is provided with a bottom, "R," forming the retainer "E" in the upper end and part of the heating space, "D," in the lower end, and below the bottom "R." The bottom "R" is placed, in the cylinder, far enough above the upper side of the lid, "*i*," to give sufficient room, between the lid and itself, for valves "O" and slide "N" (see Fig. 3).

"E" is the retainer for holding the liquid and is formed by the upper end of cylinder "G" and the bottom "R;" it is covered by means of a handled drinking cup, "F." When the coffee is being heated, however, the cup is removed and placed bottom side down over the retainer, "E;" or the cup may be left loosely hanging in its inverted position over retainer "E" so as to allow the developing steam to escape, which is necessary.

"F" is a cup provided with a handle and is used to cover retainer "E" to prevent the spilling of its contents, and to drink out of.

"O" are valves in the body of cylinder "G," and situated between the bottom, "R," and the upper side of the lid, "*i*," to admit the escape of gases and other products of combustion developed in the heating space, "D."

"N" is an annular slide designed to cover valves "O;" it has a perforation, "S," which exposes the valves, "O;" when not in use and when necessary to extinguish the flame of the heating device, "C," the slide, "N," is turned by means of the thumb piece "M" so that valves "O" become entirely covered. Slide "N" is also used to regulate the amount of ventilation through valves "O."

"M" is a projection on slide "N," and by means of which the slide is turned back and forth over valves "O."

"B" is a removable tray designed to hold the heating device, "C;" it has a flange, "*p*," with cut-off portions, "*a*," to enable it to pass the support, "H," (see Fig. 1). The tray, "B" is made to fit smoothly over the lower end of cylinder "G;" when so fitted, it forms the heating space "D," which contains the heating device, "C." When flange "*p*" of tray "B" has passed support "H," when tray "B" is being fitted over lower end of cylinder "G," the tray is turned so that the uncut portion of flange "*p*" rests on the support, "H," thus maintaining the tray in its proper position.

"H," as already noted, is a bar or support, secured transversely to the under side of the lid, "*i*," in such a way as to leave a sufficient space between it and the lid to receive the flange, "*p*," of tray "B," which this transverse bar is designed to support in its proper position.

In the body of the tray, "B," and a suitable distance above the bottom of it, are valves, "*r*," to admit air to heating space "D," to make combustion possible.

"V" is an annular slide designed to cover valves "*r*" in tray "B;" it has a perforation, "X," which exposes valves "*r*." To prevent any odors from passing into the pail from heating space "D," valves "*r*" should be kept covered except when the liquid in retainer "E" is being heated.

"W" is a thumb piece attached to slide "V" and by means of which the slide is turned.

"D" is the heating space in which the heating device, "C," is located and is formed by fitting tray "B" over the lower end of cylinder "G."

"Z" are valves in the upper side of the body of the tray, "P," to admit air, through valves "r" in tray "B," to heating space "D," to make combustion possible. These valves, "Z," (see Fig. 2), are covered and uncovered by means of a slide, "T." When the liquid in retainer "E" is not being heated, these valves should be kept covered.

The tray, "B," should be so placed, when in position, that the valves, "r," in it, are directly opposite to the valves, "Z," in the body of the tray "P," to allow the air to pass freely from the outside of the pail into the heating space, "D," to allow of perfect combustion in said space.

"C" is a device for heating the liquid contained in the retainer, "E," and is placed in the tray "B." It is composed of a font, for holding kerosene oil, an ordinary lamp burner, and a wick, and, although not shown in the drawings, it has a cap and an opening through which the font is filled. No chimney is necessary, as the lamp, or device, burns with a clear, smokeless flame without such a device, the heating space itself acting as a chimney.

When ready to heat the liquid in the retainer, "E," the lid, "i," is removed from the tray, "P;" the tray "B" is detached from cylinder "G;" the lamp or heating device, "C," is lighted and replaced in tray "B," which is again fitted over the lower end of cylinder "G;" valves "O o," "r" and "Z" are opened, and the lid, "i," is again placed in its position covering tray "P" as before; or, if desirable, the lid, "i" may be placed transversely over the tray, "P."

The heating arrangement is so constructed that the coffee or other liquid may be heated whether the pail is indoors or out of doors, making it very convenient to all persons who use this class of utensils and provides for them a warm and appetizing lunch when circumstances compel them to take their noonday meals away from home, conducing to special comforts the year around, and peculiarly so during the colder seasons. It is simple in construction and economical in cost.

The heating arrangement may, of course, be used with various types of pails or similar vessels, while various modifications and adaptations may be made by the skilled mechanic without departing from the scope of the following claim.

What I claim is—

In a dinner pail, a lid having a cylinder provided with a bottom, valves in said cylinder to allow the escape of gases and products of combustion, an annular slide to open and close said valves, a detachable tray fitted over the lower end of said cylinder, valves in said tray to admit of ventilation, an annular slide to cover and uncover said valves, a stay to support said tray in position, a heating device in said tray, valves in the body of the pail to afford ventilation, and a slide to cover and uncover said valves.

HENRY W. RYDING.

Witnesses:
LUDVIG LAGERSTROM,
JOHN A. LACKEY.